(12) United States Patent
Singh et al.

(10) Patent No.: US 11,363,038 B2
(45) Date of Patent: Jun. 14, 2022

(54) DETECTION IMPERSONATION ATTEMPTS SOCIAL MEDIA MESSAGING

(71) Applicant: INTERNATIONAL BUSINESS MACHINES CORPORATION, Armonk, NY (US)

(72) Inventors: Jasmeet Singh, High Point, NC (US); Andrew R. Freed, Durham, NC (US); Rebecca Rose James, Cary, NC (US); Stephan Roorda, Fuquay-Varina, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 484 days.

(21) Appl. No.: 16/520,391

(22) Filed: Jul. 24, 2019

(65) Prior Publication Data
US 2021/0029141 A1    Jan. 28, 2021

(51) Int. Cl.
| G06F 15/16 | (2006.01) |
| H04L 9/40 | (2022.01) |
| H04L 51/52 | (2022.01) |
| G06F 40/279 | (2020.01) |

(52) U.S. Cl.
CPC ........ *H04L 63/1416* (2013.01); *G06F 40/279* (2020.01); *H04L 51/32* (2013.01)

(58) Field of Classification Search
CPC .... H04L 63/1416; H04L 51/32; G06F 40/279
USPC .................................. 709/206, 204, 217, 203
See application file for complete search history.

(56) References Cited

U.S. PATENT DOCUMENTS

| 5,995,927 A | 11/1999 | Li |
| 8,225,413 B1 | 7/2012 | De et al. |
| 9,917,803 B2 | 3/2018 | Chang et al. |
| 2012/0254333 A1 | 10/2012 | Chandramouli et al. |
| 2013/0151240 A1 | 6/2013 | Myslinski |

(Continued)

OTHER PUBLICATIONS

Dascalescu, Ana "The ABCs of Detecting and Preventing Phishing Stay out of cyber criminals' phishing net with these actionable tips" Last updated on Jul. 25, 2018; Available online at https://heimdalsecurity.com/blog/abcs-detecting-preventing-phishing/; 41 pgs.

(Continued)

*Primary Examiner* — Kaylee J Huang
(74) *Attorney, Agent, or Firm* — Cantor Colburn LLP; Jorge Maranto

(57) ABSTRACT

Embodiments include a method, system and computer program product for detecting impersonation attempts in social media messaging. Aspects include receiving, via a social media network, a message from a sender to a recipient and analyzing a content of the message to extract factual statements from the message. Aspects also include analyzing a profile of the recipient to extract facts from the profile and comparing each of the factual statements to the facts from the profile. Based on a determination that one of the factual statements are verifiable by at least one of the facts, aspects include assigning a likelihood score to the factual statements. Aspects further include calculating a legitimacy score for the message based at least in part on the likelihood score of each verified factual statement from the message and transmitting the legitimacy score and the message to the recipient.

17 Claims, 5 Drawing Sheets

(56) References Cited

U.S. PATENT DOCUMENTS

| | | | |
|---|---|---|---|
| 2015/0188941 A1 | 7/2015 | Boshmaf et al. | |
| 2016/0014151 A1* | 1/2016 | Prakash | H04L 63/1483 726/22 |
| 2017/0142043 A1* | 5/2017 | Narayanswamy | H04L 51/16 |
| 2017/0358032 A1 | 12/2017 | Huffner et al. | |
| 2019/0109863 A1* | 4/2019 | Traore | H04L 63/126 |

OTHER PUBLICATIONS

Goga, Oana "Matching user accounts across online social networks: methods and application", Web. Universite Pierre et Marie Curie, Paris VI, 2014; HAL Id: tel-01165052; https://tel.archivesouvertes.fr/tel-01165052/document Submitted Jun. 18, 2015; 151 pgs.

Goldberg, Andrew "How Companies Are Detecting Spear Phishing Attacks Using Machine Learning" Last Modified May 18, 2018; business.com; Available Online at https://www.business.com/articles/machine-learning-spear-phishing/; 7 pgs.

Gueterman, Forrest "RISKIQ—That's Not You: Social Media Impersonation and Phishing" dated Apr. 21, 2017; https://www.riskiq.com/blog/labs/social-impersonation-phishing/; 5 pgs.

Identity Guard With Watson "Identity Theft on Social Media: Dealing with Imposters" Available Online at: https://www.identityguard.com/news-insights/identity-theft-on-social-media-dealing-with-imposters/; dated Sep. 10, 2018; 6 pgs.

Lord, Nate "Phishing Attack Prevention: How to Identify Avoid Phishing Scams in 2019"; Datainsider; Cyber Security (/Blog/Search/Cyber-Security); https://digitalguardian.com/author/nate-lord; May 15, 2019; 139 pgs.

Mell, Peter et al. "The NIST Definition of Cloud Computing" Recommendations of the National Institute of Standards and Technology; NIST Special Publication 800-145; Sep. 2011; 7 pgs.

Shrivastava, Sarang et al. "Imposter Detection Through Chat Analysis", Twelfth International Multi-Conference on Infomnation Processing-2016 (IMCIP-2016); Available online at www.sciencedirect.com; Procedia Computer Science 39 (2016) pp. 540-548.

Torky, Mohamed "Recognizing Fake identities in Online Social Networks based on a Finite Automaton approach" Conference Paper—IEEE 2016; 12th Int'l Computer Engineering Conference (ICENCO), IEEE, Dec. 28-29, 2016, Cairo, Egypt; 8 pgs.

Villar-Rodriguez, Esther et al. "On a Machine Learning Approach for the Detection of Impersonation Attacks in Social Networks" book Intelligent Distributed Computing VIII (pp. 259-268); Abstract Only; Online at https://www.researchgate.net/publication/278680027_On_a_Machine_Learning_Approach . . . .

Zerofox Research "Social Engineering in the Social Media Age: Top Fraudulent Account & Impersonator Tactics", 2016; https://htv-prod-media.s3.amazonaws.com/files/emerging-social-media-tactics-report-1488299453.pdf; 26 pgs.

\* cited by examiner

DETECTION IMPERSONATION ATTEMPTS SOCIAL MEDIA MESSAGING

BACKGROUND

The present invention generally relates to computing networks, and more specifically to the detection of impersonation attempts using social media messaging.

Social media platforms allow users to create profiles that represent the user's interests and a network of friends. For example, the user profile can include information about the types of groups the user is a member such as a cycling club, a book club, etc. The user can also include information regarding their current location, employer, pictures, posts, and the like. Oftentimes a user's profile can be used to determine similar groups that the user may be interested in joining. In addition, a user's network of friends can be used to suggest or recommend friends. Because user profiles can be easily created, a common problem in social media networks is the proliferation of fake accounts/profiles.

SUMMARY

Embodiments of the present invention are directed to a computer-implemented method for performing detection of genuine social media profiles. A non-limiting example of the computer-implemented method includes receiving, via a social media network, a message from a sender to a recipient and analyzing a content of the message to extract one or more factual statements from the message. The method also includes analyzing a profile of the recipient to extract one or more facts from the profile and comparing each of the one or more factual statements to the one or more facts from the profile. Based on a determination that one of the one or more factual statements are verifiable by at least one of the one or more facts, the method includes assigning a likelihood score to the one of the one or more factual statements, wherein the likelihood score is based at least in part on an accessibility of the at least one of the one or more facts. The method further includes calculating a legitimacy score for the message based at least in part on the likelihood score of each verified factual statement from the message and transmitting the legitimacy score and the message to the recipient.

Embodiments of the present invention are directed to a system for detecting genuine social media profiles. A non-limiting example of the system includes a storage medium, the storage medium being coupled to a processor. The processor is configured to receive, via a social media network, a message from a sender to a recipient and to analyze a content of the message to extract one or more factual statements from the message. The processor is also configured to analyze a profile of the recipient to extract one or more facts from the profile and to compare each of the one or more factual statements to the one or more facts from the profile. Based on a determination that one of the one or more factual statements are verifiable by at least one of the one or more facts, the processor is configured to assign a likelihood score to the one of the one or more factual statements. The processor is further configured to calculate a legitimacy score for the message based at least in part on the likelihood score of each verified factual statement from the message and to transmit the legitimacy score and the message to the recipient.

Embodiments of the invention are directed to a computer program product for performing detection of genuine social media profiles, the computer program product comprising a computer-readable storage medium having program instructions embodied therewith. The program instructions are executable by a processor to cause the processor to perform a method. A non-limiting example of the method includes receiving, via a social media network, a message from a sender to a recipient and analyzing a content of the message to extract one or more factual statements from the message. The method also includes analyzing a profile of the recipient to extract one or more facts from the profile and comparing each of the one or more factual statements to the one or more facts from the profile. Based on a determination that one of the one or more factual statements are verifiable by at least one of the one or more facts, the method includes assigning a likelihood score to the one of the one or more factual statements, wherein the likelihood score is based at least in part on an accessibility of the at least one of the one or more facts. The method further includes calculating a legitimacy score for the message based at least in part on the likelihood score of each verified factual statement from the message and transmitting the legitimacy score and the message to the recipient.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
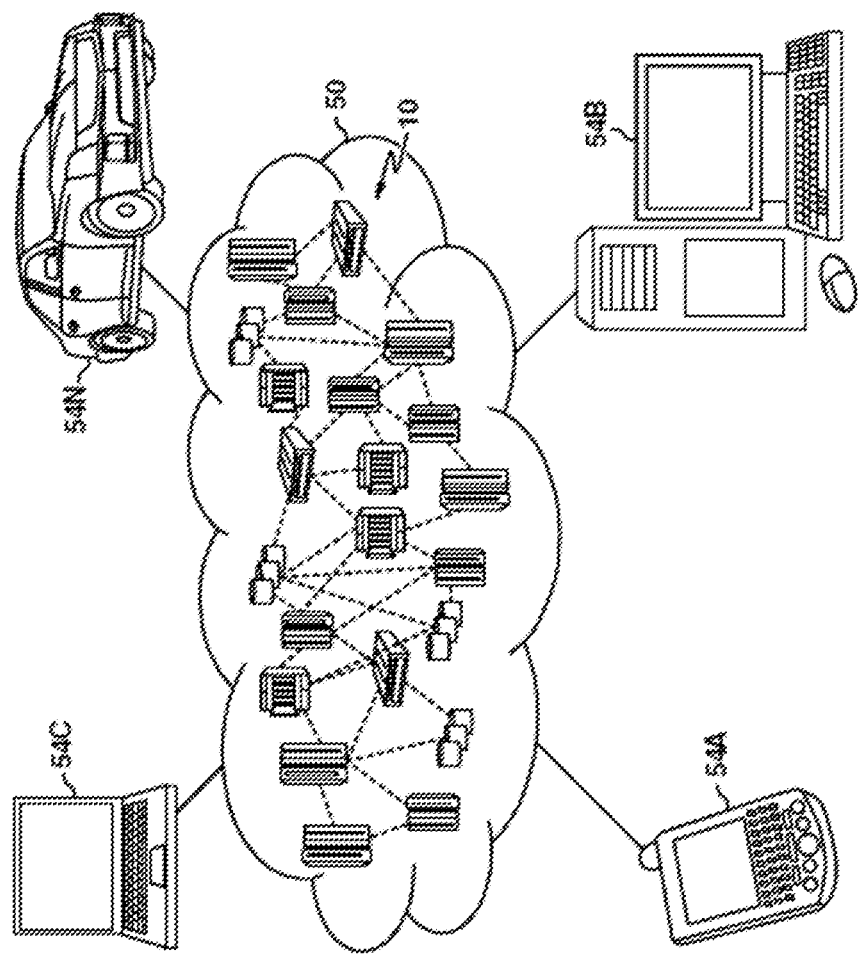
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
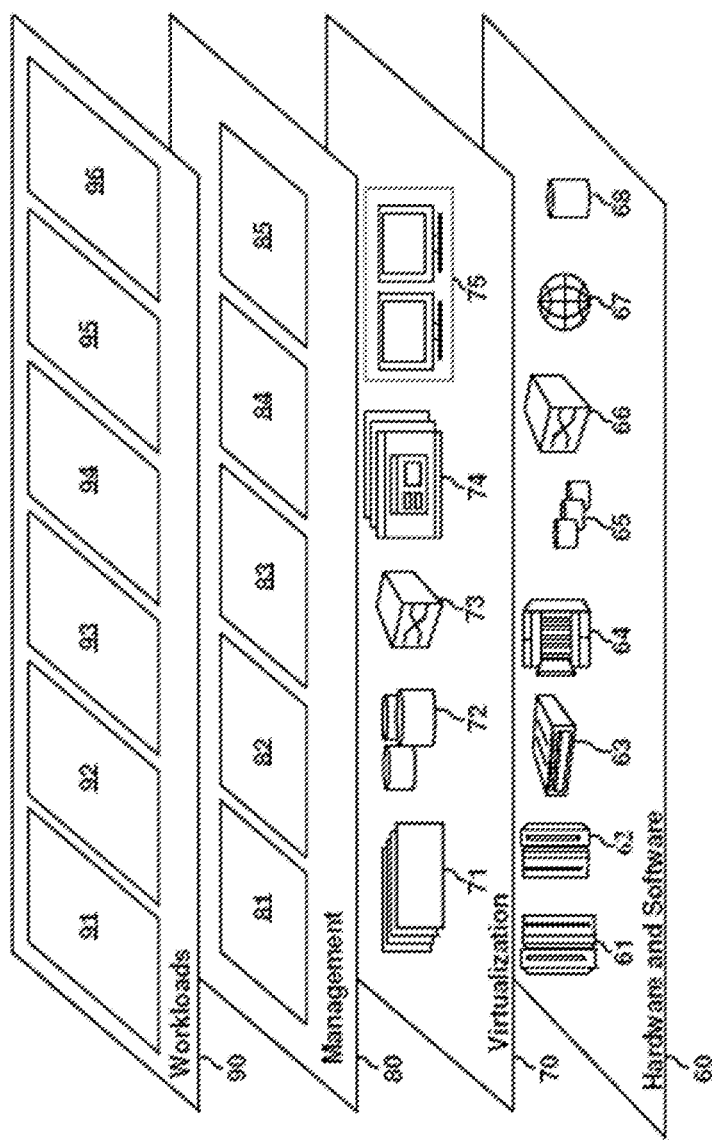
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Turning now to an overview of technologies that are more specifically relevant to aspects of the invention, social media platforms and networks allow users to create user profiles and interact with other users of the social media platform. The user profiles can include a variety of information ranging from the user's interests, posts, pictures, etc. Users can send messages to other users via the social media platform. Because user profiles can be easily created on the social media platforms there may be a need to provide a technique to authenticate a user account and/or provide a warning to a user receiving a message that the user account sending the message may be fraudulent, e.g., the sender may be impersonating another person. In today's environment, it is difficult to identify whether a message from a user profile is valid. Some users may create non-genuine user profiles in an attempt to obtain information from other users or provide malicious code to those unsuspecting users that connect with the users. The non-genuine accounts can include accounts that are questionable, fake, not authorized by a user, or invalid/unauthenticated accounts. These non-genuine accounts can include accounts that have been spoofed, replicated, duplicated, imitated, etc.

Turning now to an overview of the aspects of the invention, one or more embodiments of the invention address the above-described shortcomings of the prior art by providing techniques to detect impersonation attempts by users of a social media platform and provide a notification as to the validity of the messages received by users.

Figure 3:
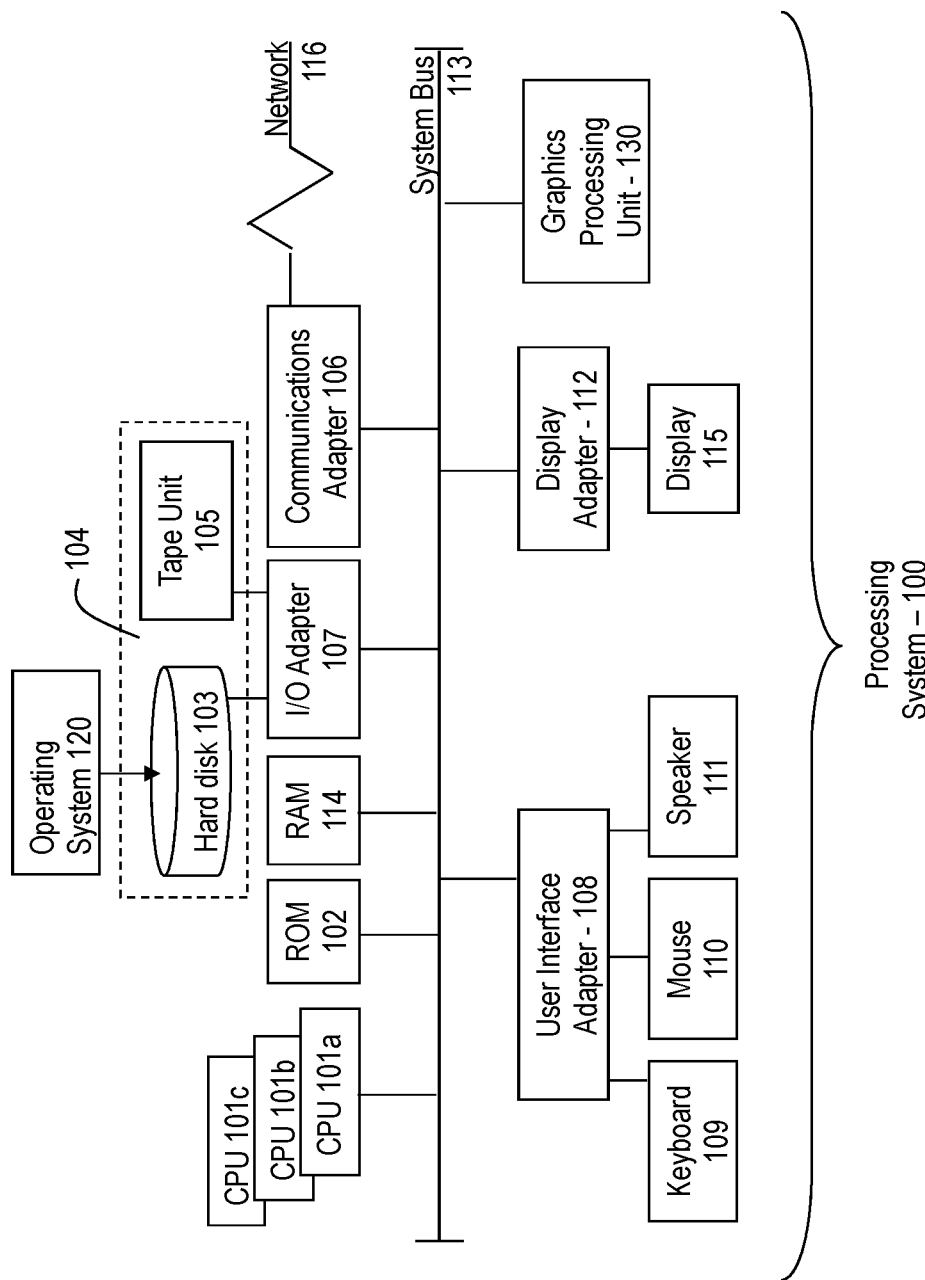
FIG. 3 depicts a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
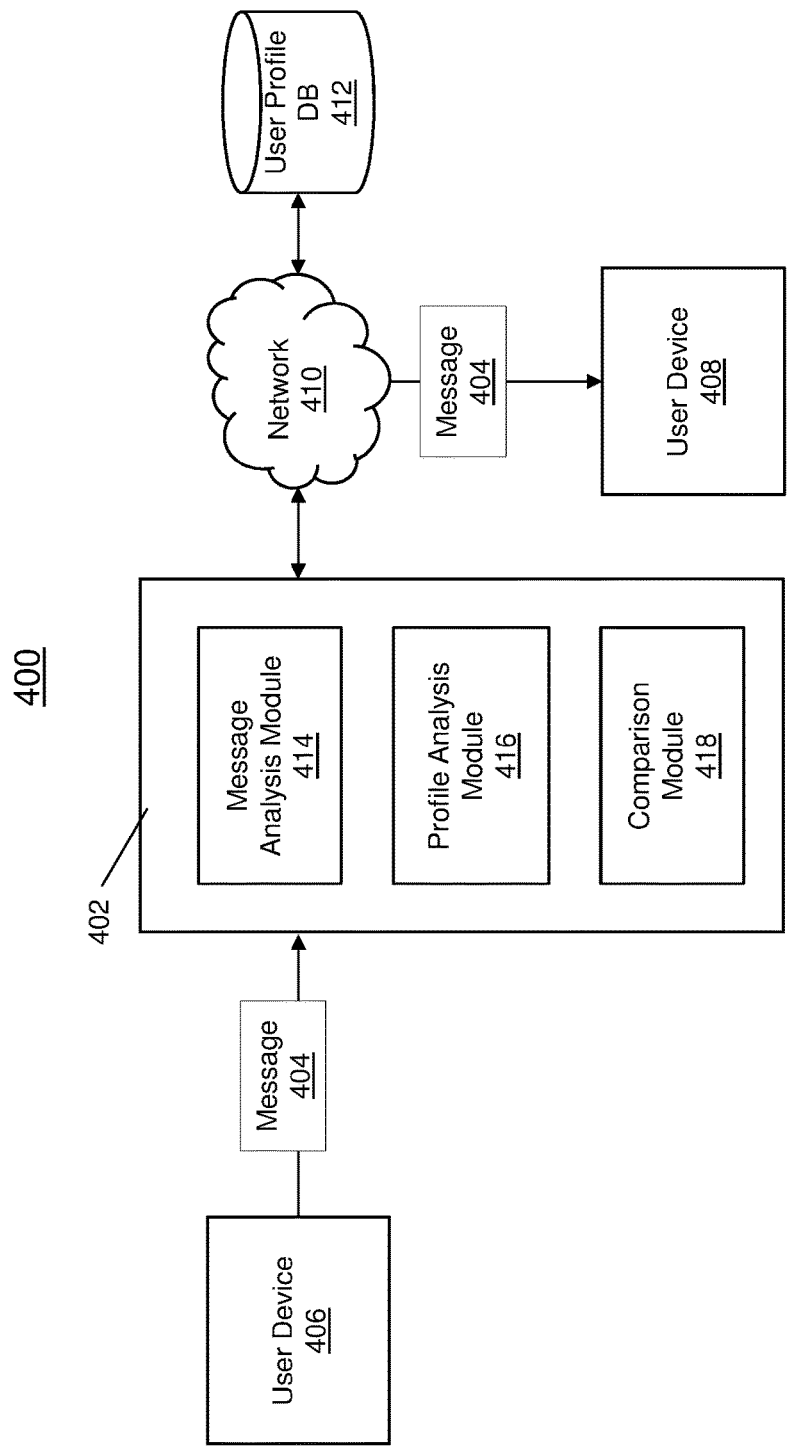
FIG. 4 depicts a block diagram of a system for message analysis in accordance with one or more embodiments of the invention.

Turning now to a more detailed description of aspects of the present invention, FIG. 4 depicts a system 400 for message analysis in accordance with one or more embodiments of the invention. The system 400 includes a server 402 that includes a plurality of hardware/software components for performing various processes. The server 402 may be embodied in a cloud computing system such as the one shown in FIGS. 1-2 or in a processing system such as the one shown in FIG. 3.

In exemplary embodiments, the server 402 is configured to receive messages 404 from a user device 406 that is transmitted to another user device 408 over a network 410. The messages 404 include information such as the sending user's ID and the recipient's ID. The IDs are used to obtain user profile information from a user profile database 412 that will be analyzed by the server 402 in accordance with one or more embodiments of the invention. As shown in FIG. 4, the server 402 includes a plurality of modules 414, 418 and 418 but it should be understood the server 402 is not limited by the illustrated example. The modules 414, 418 and 418 are configured to analyze various categories of information associated with the message 404 and with the sender and/or recipient user profiles. The user profiles include but are not limited to user activity, associated friends, and user posts/messages. The user profiles can also include other categories that can be selected and configured by an administrator.

In exemplary embodiments, the server 402 includes a message analysis module 414 that is configured to analyze the content of the message 404. The message analysis module 414 uses natural language processing algorithms to analyze the content of the message 404 and to extract one or more factual statements from the message 404. The server 402 also includes a profile analyzer module 416 that is configured to analyze the profile associated with a recipient user profile account. The analysis of the profile includes, but is not limited to, identifying groups that the recipient is a member of, analyzing the text of posts of the recipient using one or more natural language processing algorithms, analyzing content extracted from one or more images posted by the recipient, and the like. In exemplary embodiments, the profile analysis module 416 is configured to extract one or more facts about the recipient from the user profile of the recipient. In exemplary embodiments, the profile analyzer module 416 is further configured to assign an accessibility score to each fact that is extracted from the user profile of the recipient. The accessibility score indicates how difficult the extraction of the fact is from the user profile of the recipient. In one embodiment, the accessibility score ranges from zero to one, where a one indicates that the fact is easily accessible, i.e., that it can be easily obtained from the landing page, or home page, of the user profile of the recipient. In general, the accessibility score decreases based on the distance away from the g page, or home page, of the user profile of the recipient that the information supporting the fact is located. In addition, the accessibility score is lower for information that is harder to extract, such as information obtained by image analysis techniques as opposed to textual extraction.

The server 402 also includes a comparison module 418 that is configured to compare the one or more factual statements extracted from the message 404 by the message analysis module 414 to the one or more facts about the recipient from the user profile of the recipient by the profile analyzer module 416. The comparison module 418 is configured to assign a likelihood score to the one of the one or more factual statements extracted from the message 404. In exemplary embodiments, the likelihood score is based on the accessibility score assigned to a fact extracted from the user profile of the recipient that matches a fact extracted from the message 404. The comparison module 418 is further configured to calculate a legitimacy score for the message 404 based at least in part on the likelihood score of each verified factual statement from the message 404. The server 402 is further configured to transmit the message 404, including the legitimacy score, to a user device 408 associated with the recipient.

It should be understood the server 402 can include additional processing modules that can be configured to perform further analysis on other categories of information available in the social network. It should also be understood that any combination or a different combination of categories can be analyzed in the embodiments of the invention.

Figure 5:
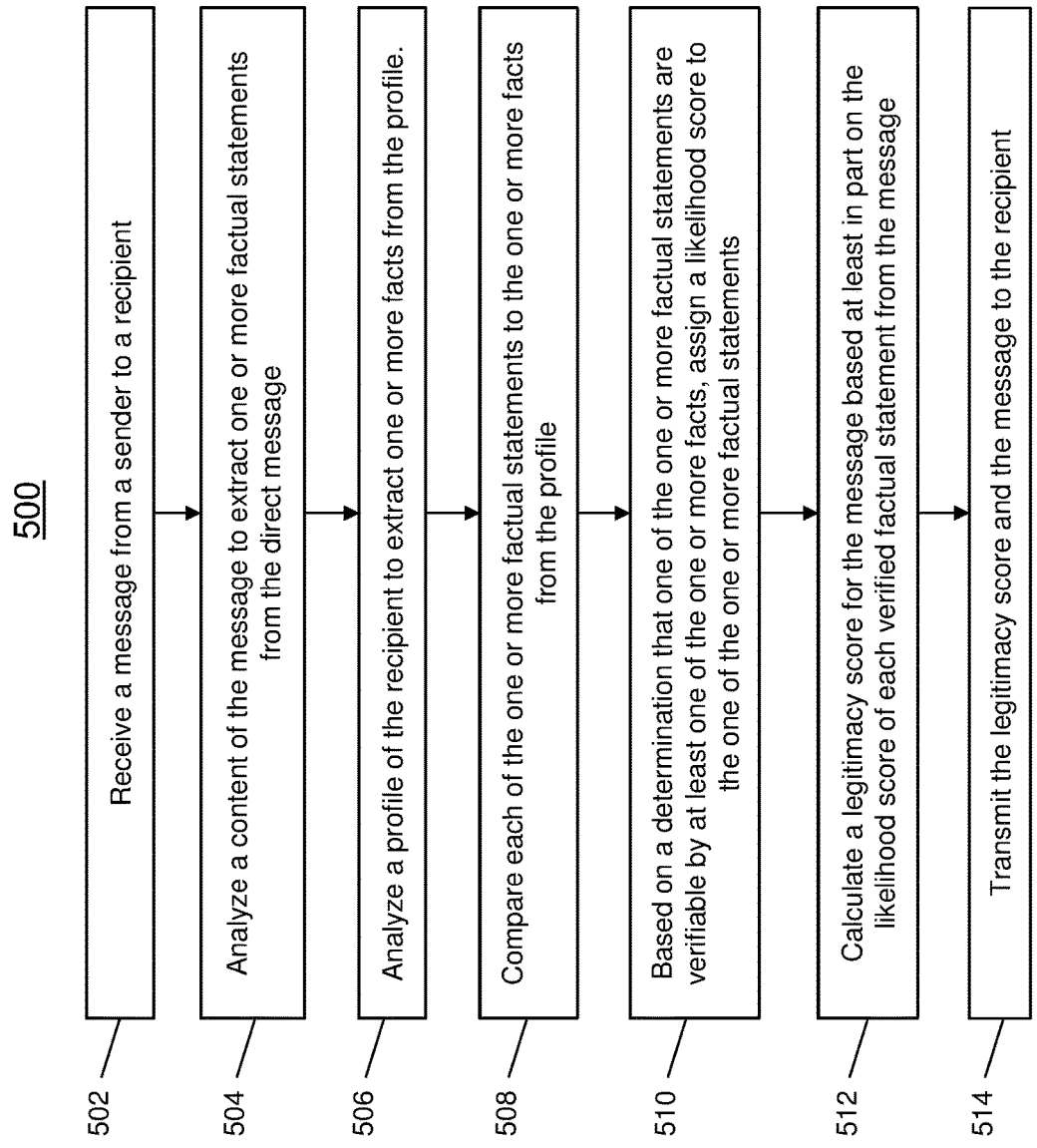
FIG. 5 depicts a flowchart of a method for message analysis in accordance with one or more embodiments of the invention.

FIG. 5 depicts a flowchart of a method 500 for social media messaging analysis in accordance with one or more embodiments of the invention. In some embodiments of the invention, the process 500 is executed by the server 402 as shown in FIG. 4. The method 500 includes receiving a message from a sender to a recipient, as shown at block 502. Next, as shown at block 504, the method 500 includes analyzing the content of the message to extract one or more factual statements from the message. In exemplary embodiments, one or more natural language processing algorithms are used to extract one or more factual statements from the message. The method 500 also includes analyzing a profile of the recipient to extract one or more facts from the profile, as shown at block 506. In exemplary embodiments, analyzing the profile of the recipient includes one or more of identifying groups that the recipient is a member of, analyzing the text of posts of the recipient using one or more natural language processing algorithms, analyzing content extracted from one or more images posted by the recipient, and the like.

The method 500 includes comparing each of the one or more factual statements to the one or more facts from the profile, as shown at block 508. Next, the method 500 includes assigning a likelihood score to the one of the one or more factual statements based on a determination that one of the one or more factual statements are verifiable by at least one of the one or more facts. In exemplary embodiments, the likelihood score is based at least in part on the accessibility of the at least one of the one or more facts. The accessibility of the at least one of the one or more facts is calculated based on where the one of the one or more facts is located in the profile of the recipient.

In general, the likelihood score is calculated such that the easier a fact is to obtain from a user profile the higher the likelihood score will be, i.e., how accessible the fact is from the user profile. For example, if a landing page, or home page, of a profile of an individual reflects that attended a certain school, the likelihood score associated with the fact that the individual attended that school will be high. In one embodiment, the likelihood score is a number that ranges from zero to one, with one reflecting a fact that is verifiable by the landing page of a profile of an individual and zero reflecting a non-verifiable fact. In exemplary embodiments, the accessibility of the at least one of the one or more facts is inversely related to a depth of the at least one of the one or more facts in the profile of the recipient. As used herein, the depth of the at least one of the one or more facts in the profile of the recipient is a number of clicks away from a landing page of the profile that the at least one of the one or more facts is located.

Continuing with reference to FIG. 5, the method 500 also includes calculating a legitimacy score for the message based at least in part on the likelihood score of each verified factual statement from the message, as shown at block 512. In exemplary embodiments, the legitimacy score is further based on a number of the one or more factual statements are not verifiable by at least one of the one or more facts. The legitimacy score is used to indicate the likelihood that the sender is, in fact, the person that they claim to be. In one embodiment, the likelihood score ranges from zero to one with one representing the highest confidence that the sender is, in fact, the person that they claim to be. In exemplary embodiments, the likelihood score is reduced by each non-verifiable fact present in the message. The method 500 also includes transmitting the legitimacy score and the message to the recipient, as shown at block 514.

In one embodiment, the profile of the recipient that is analyzed to extract the one or more facts is the profile of the recipient on the social media network that the message is sent through. In another embodiment, the profile of the recipient that is analyzed to extract the one or more facts is a profile of the recipient on a social media network other than the social media network through which the message is sent through.

In exemplary embodiments, additional data can be used to calculate the legitimacy score associated with the message. For example, information can also be extracted and analyzed from the profile associated with the account of the sender of the message.

The techniques described herein provide for detecting the likelihood that a message sent via a social media platform is fraudulent or not from a genuine user account. Upon the determination, the social media platform can present the results to the user along with the message which provides a level of protection to the user's data. The technological contribution includes increasing user confidence in using social media platforms by providing a level of trustworthiness between users.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for detecting impersonation attempts in social media messaging, the computer-implemented method comprising:
   receiving, via a social media network, a message from a sender to a recipient;
   analyzing a content of the message to extract one or more factual statements from the message;
   analyzing a profile of the recipient to extract one or more facts from the profile;
   comparing each of the one or more factual statements to the one or more facts from the profile;
   based on a determination that one of the one or more factual statements are verifiable verified by at least one of the one or more facts, assigning a likelihood score to the one of the one or more factual statements, wherein the likelihood score is based at least in part on an accessibility of the at least one of the one or more facts;
   calculating a legitimacy score for the message based at least in part on the likelihood score of each verified factual statement from the message; and
   transmitting the legitimacy score and the message to the recipient, wherein the accessibility of the at least one of the one or more facts is calculated based on where the at least one of the one or more facts is located in the profile of the recipient.

2. The computer-implemented method of claim 1, wherein the accessibility of the at least one of the one or more facts is inversely related to a depth of the at least one of the one or more facts in the profile of the recipient.

3. The computer-implemented method of claim 2, wherein the depth of the at least one of the one or more facts is a number of clicks away from a landing page of the profile that the at least one of the one or more facts is located.

4. The computer-implemented method of claim 1, wherein natural language processing is used to extract the one or more factual statements from the message.

5. The computer-implemented method of claim 1, wherein the profile is the profile of the recipient on a second social media network that is different than the social media network.

6. The computer-implemented method of claim 1, wherein the legitimacy score is further based on a number of the one or more factual statements are not verifiable by at least one of the one or more facts.

7. A system for detecting impersonation attempts in social media messaging, the system comprising:
   a storage medium, the storage medium being coupled to a processor;
   the processor configured to:
   receive, via a social media network, a message from a sender to a recipient;
   analyze a content of the message to extract one or more factual statements from the message;
   analyze a profile of the recipient to extract one or more facts from the profile;
   compare each of the one or more factual statements to the one or more facts from the profile;
   based on a determination that one of the one or more factual statements are verified by at least one of the one or more facts, assign a likelihood score to the one of the one or more factual statements, wherein the likelihood score is based at least in part on an accessibility of the at least one of the one or more facts;
   calculate a legitimacy score for the message based at least in part on the likelihood score of each verified factual statement from the message; and
   transmit the legitimacy score and the message to the recipient, wherein the accessibility of the at least one of the one or more facts is calculated based on where the at least one of the one or more facts is located in the profile of the recipient.

8. The system of claim 7, wherein the accessibility of the at least one of the one or more facts is inversely related to a depth of the at least one of the one or more facts in the profile of the recipient.

9. The system of claim 8, wherein the depth of the at least one of the one or more facts is a number of clicks away from a landing page of the profile that the at least one of the one or more facts is located.

10. The system of claim 7, wherein natural language processing is used to extract the one or more factual statements from the message.

11. The system of claim 7, wherein the profile is the profile of the recipient on a second social media network that is different than the social media network.

12. The system of claim 7, wherein the legitimacy score is further based on a number of the one or more factual statements are not verifiable by at least one of the one or more facts.

13. A computer program product for detecting impersonation attempts in social media messaging, the computer program product comprising a computer-readable storage medium having program instructions embodied therewith, the program instructions executable by a processor to cause the processor to:

receive, via a social media network, a message from a sender to a recipient;

analyze a content of the message to extract one or more factual statements from the message;

analyze a profile of the recipient to extract one or more facts from the profile;

compare each of the one or more factual statements to the one or more facts from the profile;

based on a determination that one of the one or more factual statements are verified by at least one of the one or more facts, assign a likelihood score to the one of the one or more factual statements, wherein the likelihood score is based at least in part on an accessibility of the at least one of the one or more facts;

calculate a legitimacy score for the message based at least in part on the likelihood score of each verified factual statement from the message; and transmit the legitimacy score and the message to the recipient, wherein the accessibility of the at least one of the one or more facts is calculated based on where the at least one of the one or more facts is located in the profile of the recipient.

14. The computer program product of claim 13, wherein the accessibility of the at least one of the one or more facts is inversely related to a depth of the at least one of the one or more facts in the profile of the recipient.

15. The computer program product of claim 14, wherein the depth of the at least one of the one or more facts is a number of clicks away from a landing page of the profile that the at least one of the one or more facts is located.

16. The computer program product of claim 13, wherein natural language processing is used to extract the one or more factual statements from the message.

17. The computer program product of claim 13, wherein the profile is the profile of the recipient on a second social media network that is different than the social media network.

* * * * *